United States Patent
Ragan

(10) Patent No.: US 9,346,623 B2
(45) Date of Patent: May 24, 2016

(54) TOUCHLESS GUIDE DEVICE FOR A CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/706,147

(22) Filed: May 7, 2015

(65) Prior Publication Data

US 2015/0321854 A1    Nov. 12, 2015

Related U.S. Application Data

(60) Provisional application No. 61/990,242, filed on May 8, 2014.

(51) Int. Cl.
*B65G 21/20* (2006.01)
*B65G 54/02* (2006.01)

(52) U.S. Cl.
CPC ........ *B65G 21/2018* (2013.01); *B65G 21/2009* (2013.01); *B65G 54/02* (2013.01); *B65G 2201/0252* (2013.01); *B65G 2811/0668* (2013.01)

(58) Field of Classification Search
CPC ........... B65G 21/2009; B65G 21/2018; B65G 15/58; B65G 17/46; B65G 54/02; B65G 2201/0252; B65G 2811/0668
USPC ............... 198/457.05, 367, 370.13, 452, 636, 198/637, 619, 836.1
See application file for complete search history.

(56) References Cited

U.S. PATENT DOCUMENTS

| 3,830,353 | A | * | 8/1974 | Mojden | B65G 15/58 198/597 |
|---|---|---|---|---|---|
| 4,351,430 | A | * | 9/1982 | Mojden | H01F 7/0247 198/690.1 |
| 4,369,873 | A | * | 1/1983 | Heuft | B07C 5/362 198/367 |
| 4,823,931 | A | * | 4/1989 | Rhodes | B65G 47/26 198/445 |
| 4,850,542 | A | * | 7/1989 | Rechsteiner | H01F 41/08 198/690.1 |
| 5,483,042 | A | | 1/1996 | Sprenger et al. | |
| 6,354,224 | B1 | | 3/2002 | Devnani et al. | |
| 7,249,672 | B2 | * | 7/2007 | Heimsoth | B65G 15/44 198/604 |
| 7,832,548 | B2 | * | 11/2010 | Mueller | B21D 43/05 198/690.1 |
| 7,863,782 | B2 | | 1/2011 | Matscheko et al. | |

FOREIGN PATENT DOCUMENTS

DE    G9417849.6 U1    2/1995
JP    57-170324 A    10/1982

(Continued)

OTHER PUBLICATIONS

International Search Report and Written Opinion of the International Searching Authority, PCT/US2015/029602, mailed Aug. 19, 2015, Korean Intellectual Property Office, Republic of Korea.

*Primary Examiner* — Leslie A Nicholson, III
*Assistant Examiner* — Keith R Campbell
(74) *Attorney, Agent, or Firm* — Catherine M. Bishop

(57) ABSTRACT

A conveyor and method for moving articles comprising a conductive material across a conveying surface using a touchless guide device disposed adjacent to a product path. The guide device generates a repelling force on a conveyed product to propel the conveyed product along the product path. Embodiments of the guide device include a linear induction motor and an array of alternating permanent magnets.

14 Claims, 12 Drawing Sheets

(56) References Cited

FOREIGN PATENT DOCUMENTS

| | | |
|---|---|---|
| JP | 01-133817 A | 5/1989 |
| JP | 2005026920 U | 4/1993 |
| JP | H07-8331 U | 2/1995 |
| JP | 2008163712 A | 6/1996 |
| JP | 2004083230 A | 3/2004 |
| WO | 2010049019 A1 | 5/2010 |
| WO | 2014043821 A1 | 3/2014 |

* cited by examiner

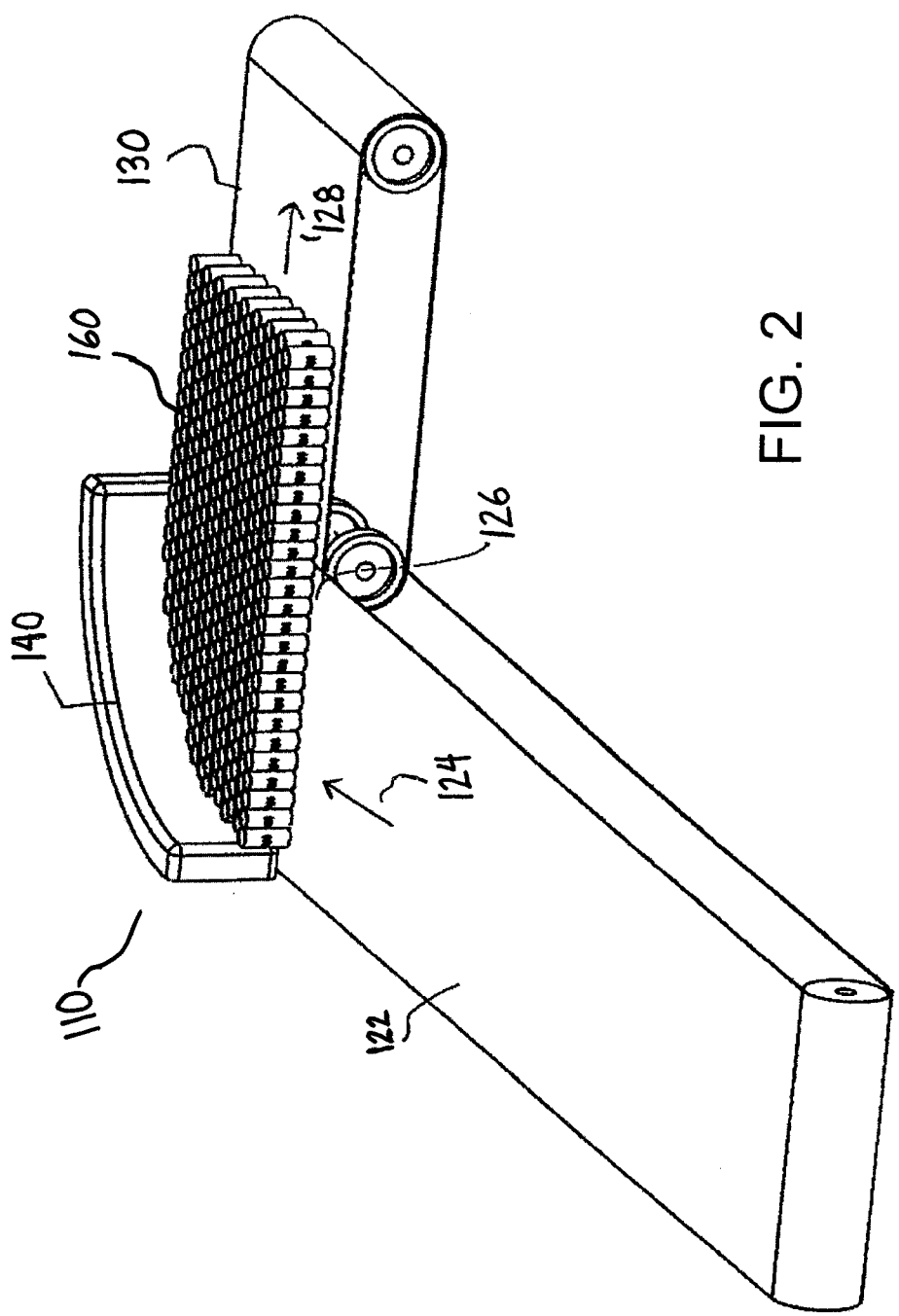

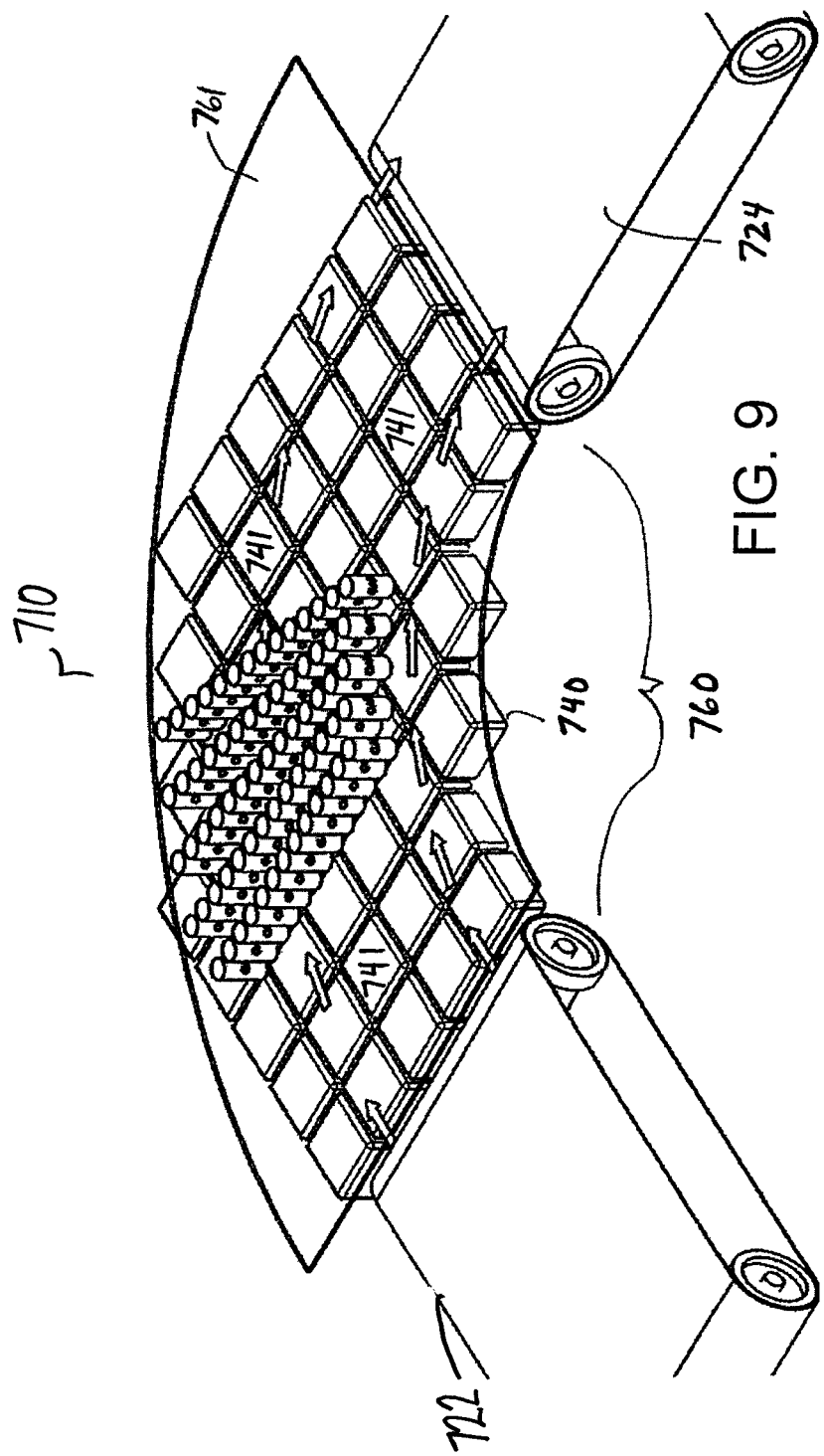

TOUCHLESS GUIDE DEVICE FOR A CONVEYOR

RELATED APPLICATIONS

The present invention claims priority to U.S. Provisional Patent Application Ser. No. 61/990,242, filed May 8, 2014 and entitled "Touchless Rail for a Conveyor", the contents of which are herein incorporated by reference.

BACKGROUND

The invention relates generally to power-driven conveyors and more particularly to the conveyance of articles containing an electrically-conductive material.

Conveyors are often used to transport articles through a manufacturing process. In some circumstances, the transportation of aluminum beverage cans through a can manufacturing process can be difficult in transition points, where the cans need to be transferred from one process step to the next. The lightweight cans are fragile and may be prone to tipping, which makes them susceptible to stranding on transfer dead plates. Such problems require manual intervention by operators, which can increase cost and risk potential contamination. In addition, the stranding of cans on the process line can result in costly mixing of can batches if all stranded cans are not removed from the process line.

SUMMARY

One version of a conveyor embodying features of the invention comprises a conveyor belt and a touchless guide device that generate a repelling force to guide products along a product path in a conveyor.

According to one aspect of the invention, a conveyor comprises a conveyor belt for conveying articles along a product path and a guide device positioned relative to the conveyor belt adjacent the product path for generating a repellent force on conveyed articles to direct the conveyed articles along the product path.

According to another aspect of the invention, a conveyor comprises a conveyor belt for conveying articles along a product path and a guide device for touchlessly guiding the articles along the product path without mechanically contacting the articles.

According to another aspect, a method of guiding a product on a conveyor belt comprises the steps of conveying a product comprising an electrically conductive material along a product path at a first conveyance speed and generating a repelling force on the product to guide the product along the product along the product path using a guide device.

BRIEF DESCRIPTION OF THE DRAWINGS

These aspects and features of the invention are described in more detail in the following description, appended claims, and accompanying drawings, in which:

FIG. 2 is an isometric view of a transfer point of a conveyor including a curved touchless rail comprising a linear induction motor according to another embodiment of the invention;

FIG. 9 shows a conveyor junction comprising an array of linear induction motors for guiding product according to another embodiment.

DETAILED DESCRIPTION

A conveyor employs a guide device for generating a repelling force to propel product along a product path with little or no contact. The guide device may comprise a linear induction motor, permanent magnet array or other device that generates a repelling force to repel the product away from the guide device and along the product path with little or no contact with the product. Aspects of the invention will be described with reference to certain illustrative embodiments, though the invention is not limited to those illustrative embodiments.

Figure 1:
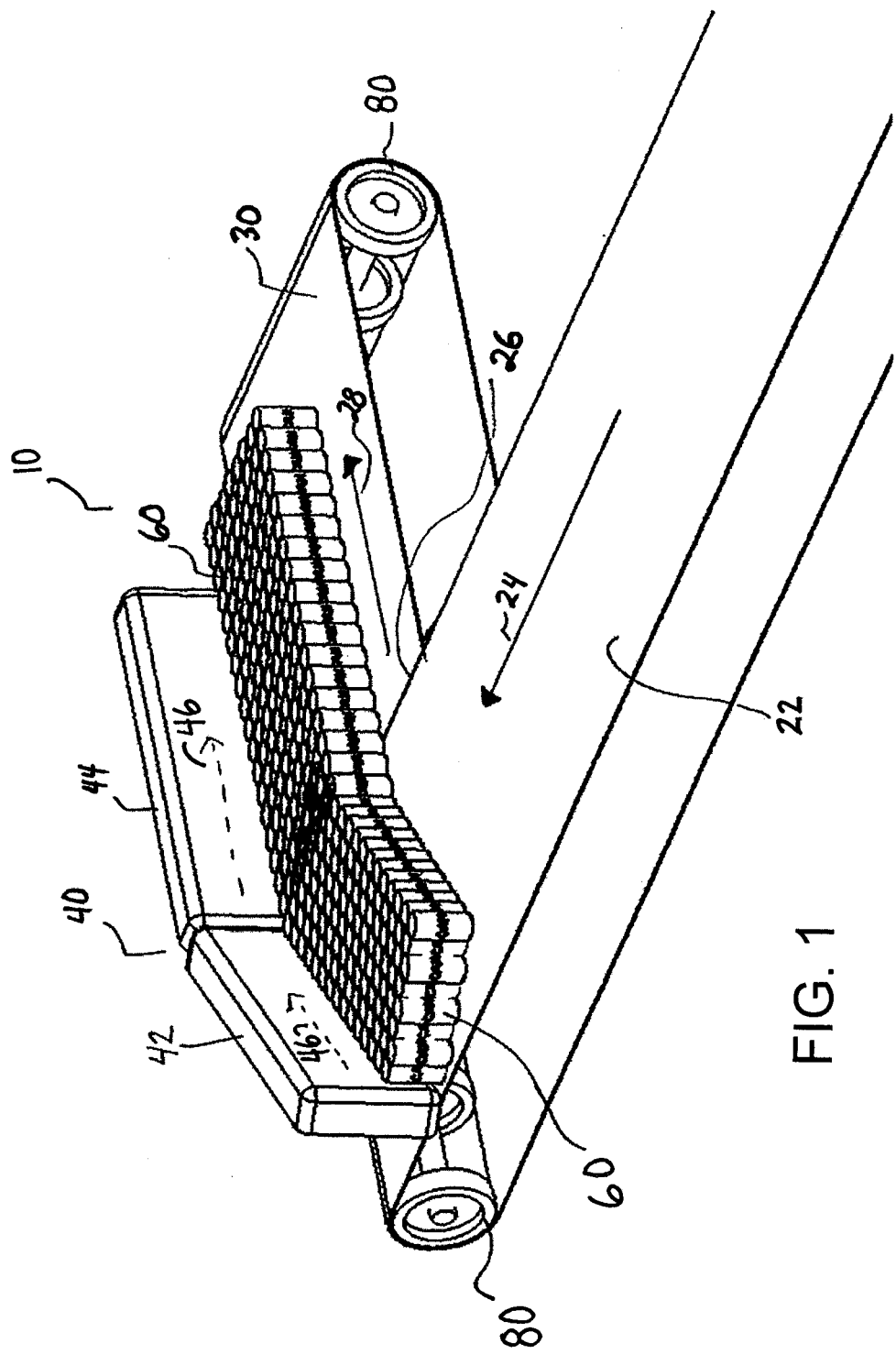
FIG. 1 is an isometric view of a transfer point of a conveyor including a touchless rail comprising a linear induction motor according to one embodiment of the invention.

A portion of a conveyor embodying features of the invention is shown in FIG. 1. The conveyor 10 transports products along a product path and comprises a first conveyor belt 22 that advances in a first direction of belt travel 24. At a transfer or junction point 26, product is transferred to a second conveyor belt 30, which receives product from the first conveyor belt 22 and conveys the product in a second direction of belt travel 28. The belt may be driven by any conventional drive means, such as sprockets 80, motor-driven drums, pulleys, or by a linear induction motor. Idle sprockets or guide elements (not shown) may be used to guide the conveyor belts, as known in the art.

The conveyor 10 may employ a touchless rail or device for guiding conveyed product along the product path while minimizing damage to the conveyed product. For example, the illustrative conveyor 10 includes a touchless rail 40 at the transfer point 26 adjacent to the product path for guiding conveyed product from the first conveyor belt 22 to the second conveyor belt 30. In the illustrative embodiment, the conveyed product comprises aluminum cans 60 or another product containing a conductive material, and the touchless rail 40 generates a repelling force, in addition to a translational force, to push the aluminum cans towards the second conveyor along a desired product path with little to no contact force.

In the embodiment of FIG. 1, the touchless rail 40 comprises a first rail 42 oriented at a first angle and positioned over the first conveyor belt 22 adjacent to a product path, and a second rail 44 adjacent to and in series with the first rail 42. The first rail 42 is shown as oriented transverse to the first direction of travel 24, preferably at an obtuse angle. The illustrative second rail 44 forms a side rail on the second conveyor belt 30 that is substantially parallel to the second direction of travel 28.

In the embodiment of FIG. 1, each rail 42, 44 is a linear induction motor (LIM) comprising a shaped multi-phase induction coil that generates a repelling force to push conveyed articles containing a conduct material through the transfer zone. Any suitable arrangement of coils may be used to generate the repelling force. For example, in one embodiment, discrete coils are arranged in a directional arrangement to guide articles that include or are formed of an electrically conductive material, such as the aluminum cans 60, in a desired direction and force the articles onto the second conveyor belt 30 or along another selected product path. The LIM coil forms a stator, and the electrically conductive material in the cans forms a conductor, which is pushed away from the stator by opposing fields generated in the stator and conductor.

In one embodiment, the coils of the LIM have a series of poles that are energized to create a magnetic field. The magnetic field propagates down the coil in a propagation direction 46. The propagating magnetic field passes through the conductive material in the cans 60 adjacent to the rails 42, 44 and induces a current in the cans opposing the magnetic field. The interaction of the primary magnetic field from the LIM 42, 44 with the induced current in the product produces a repelling force pushing the product in a selected direction without requiring much or any direct contact. Preferably, the repelling force repels the cans away from the rails 42 or 44 and pushes the cans through the transfer zone 26. In this way, product will be pushed from the first belt 22 to second belt 30 with low contact force, which prevents tipping of the cans and promotes transfer of the cans in the upright position. The vector of the repelling force depends on the particular design of the rail. Generally, the repelling force vector will be less than about 45° from the surface of the LIM.

A plurality of coils in the LIM rails 42, 44 could form discrete stators, arranged to produce a desired trajectory, or one or more coils could be shaped to produce a desired trajectory.

The guide rails 42, 44 may distribute repelling forces along the full-vertical breadth of the LIM allowing the guide rail to guide the path of the product without mechanically touching the product or risking damage to thinner gauge cans. The net force may be applied to the can center of mass to prevent tipping.

The LIM drives may be synchronized to the belt speeds, or may be synchronized to provide a change in the speed at which the product is conveyed in select locations. For example, discrete articles may be conveyed faster than other articles. The LIM speeds can be adjusted to achieve a desired product speed and-or trajectory through a conveyor.

FIG. 2 illustrates another embodiment of a touchless rail for guiding products, such as aluminum cans in a conveyor 110 through a transfer zone 126 between a first conveyor belt 122 moving in a first direction 124 and a second conveyor belt 130 moving in a second direction 128. The touchless rail 140 of FIG. 2 comprises a curved linear induction motor (LIM) that curves along product path through the transfer zone 126. The curved rail 140 employs a singled coil shaped in a circular arc, or multiple coils arranged in an arc. The illustrative arc is 90°, though the invention is not so limited. The curved rail 140 generates a propagating magnetic field that induces opposing currents in a conveyed product, illustrated as aluminum cans 160, creating a repelling force on the aluminum cans to propel the cans through a transfer zone 126 and onto the second conveyor belt 130.

Figure 3A:
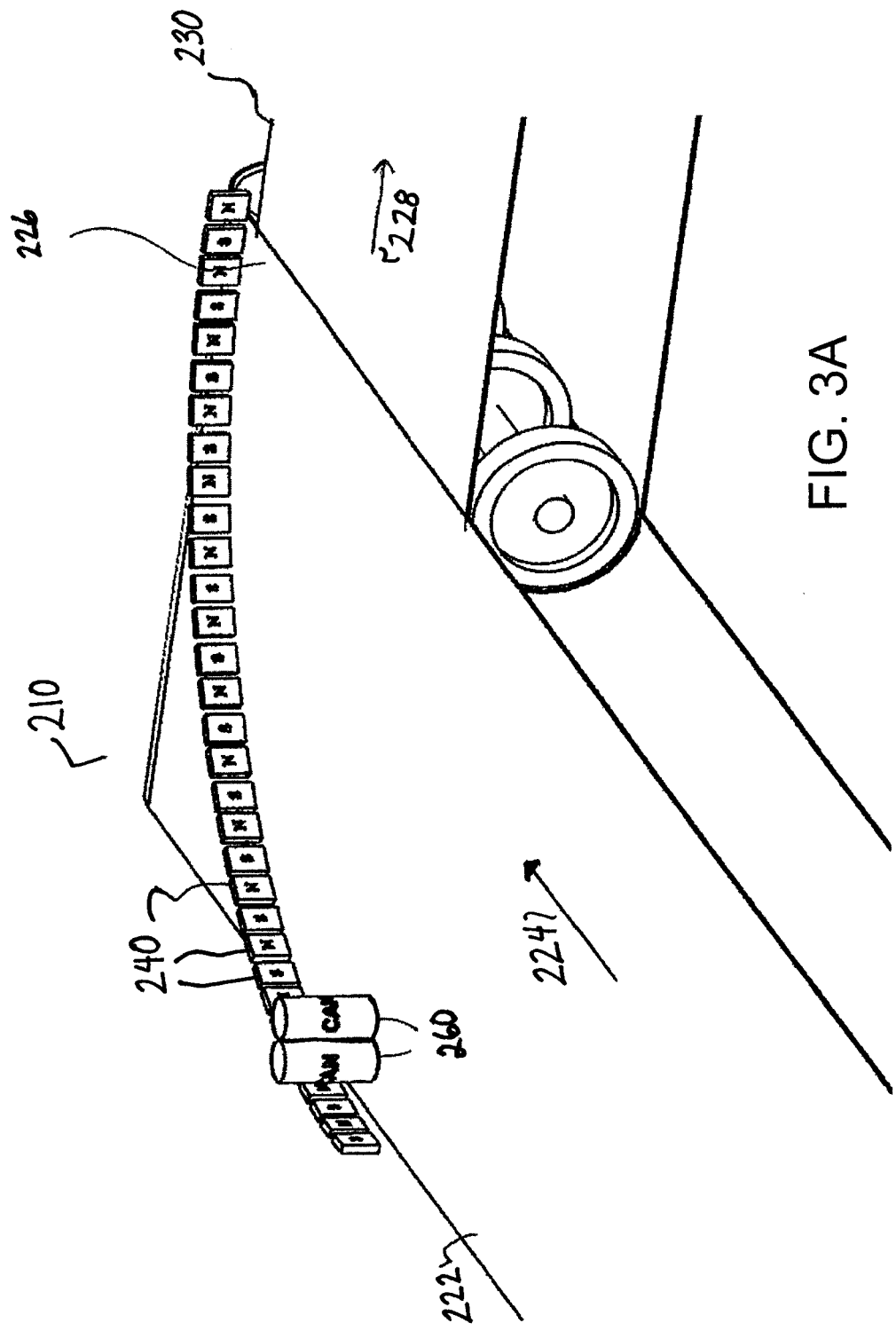
FIG. 3A is a schematic view of a junction in a conveyor having a touchless rail comprising alternating permanent magnets according to another embodiment of the invention.

Other sources can be used to generate the repelling force, and the invention is not limited to linear induction motors. For example, FIG. 3A shows a conveyor 210 having a touchless guide rail in a transfer zone 226, the touchless guide rail formed using an array of permanent magnets 240. The first conveyor belt 222 moves in direction 224. As a first conveyor belt 222 brings the product containing a conductive material, such as aluminum cans 260, past the array 240, the permanent magnet array creates a magnetic field that induces eddy drag on the outer cans closest to the array 240, facilitating transfer of the cans onto a second conveyor belt 230, moving in direction 228, with low contact force. One skilled in the art will be able to determine a suitable size, strength, orientation of the magnets to sufficiently repel the cans and propel the cans along a desired trajectory. The magnets in array 240 may have alternating polarity, the same polarity or comprise a Halbach array.

Figure 3B:
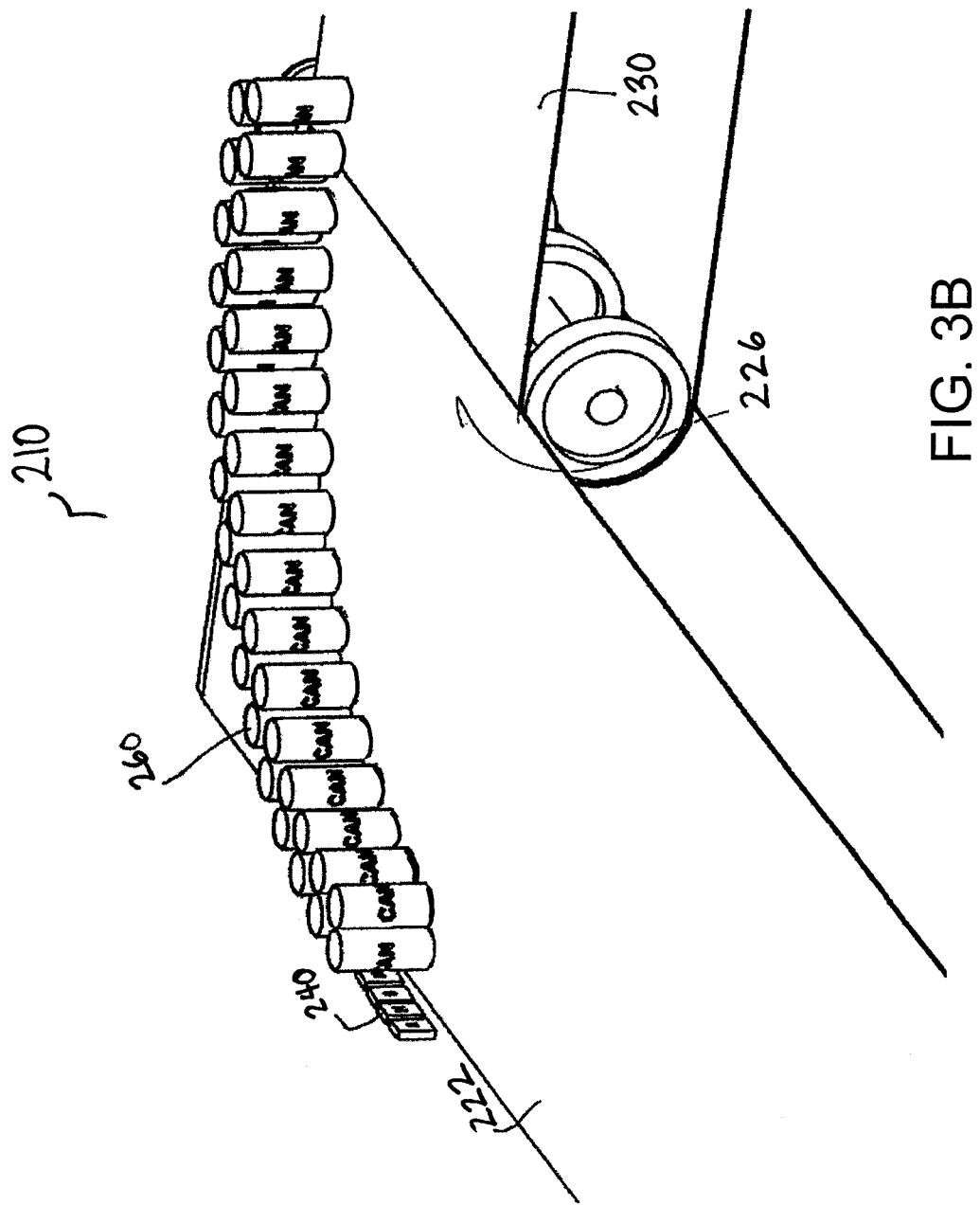
FIG. 3B shows the junction of FIG. 3A while conveying a number of aluminum cans.

FIG. 3B shows the progression of cans 260 through the transfer zone 226. As shown, the repelling force generated by the magnetic array 240 retards the motion of the outer cans, causing fluid motion of the can group, reducing pressure on the individual cans.

Figure 4:
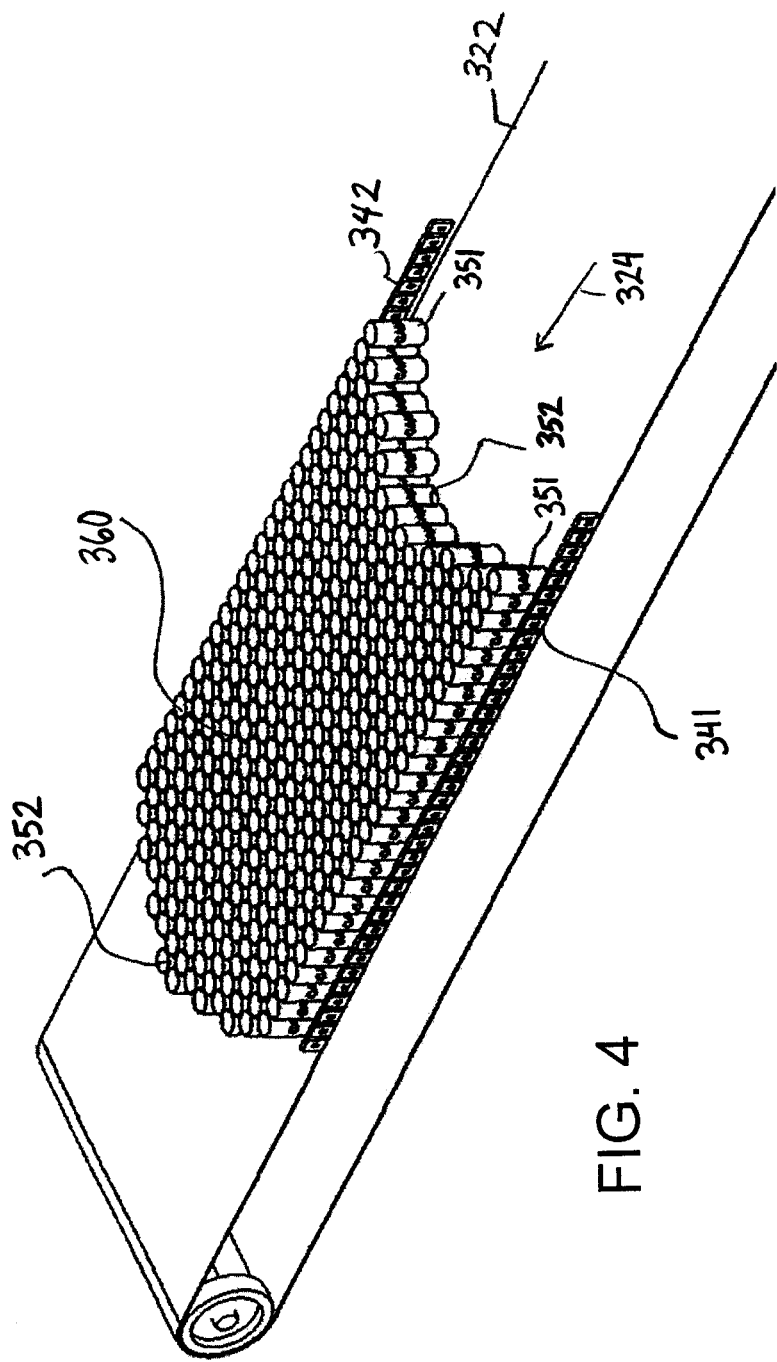
FIG. 4 shows a conveyor having touchless side rails formed by an array of alternating permanent magnets according to another embodiment of the invention.
Figure 5A:
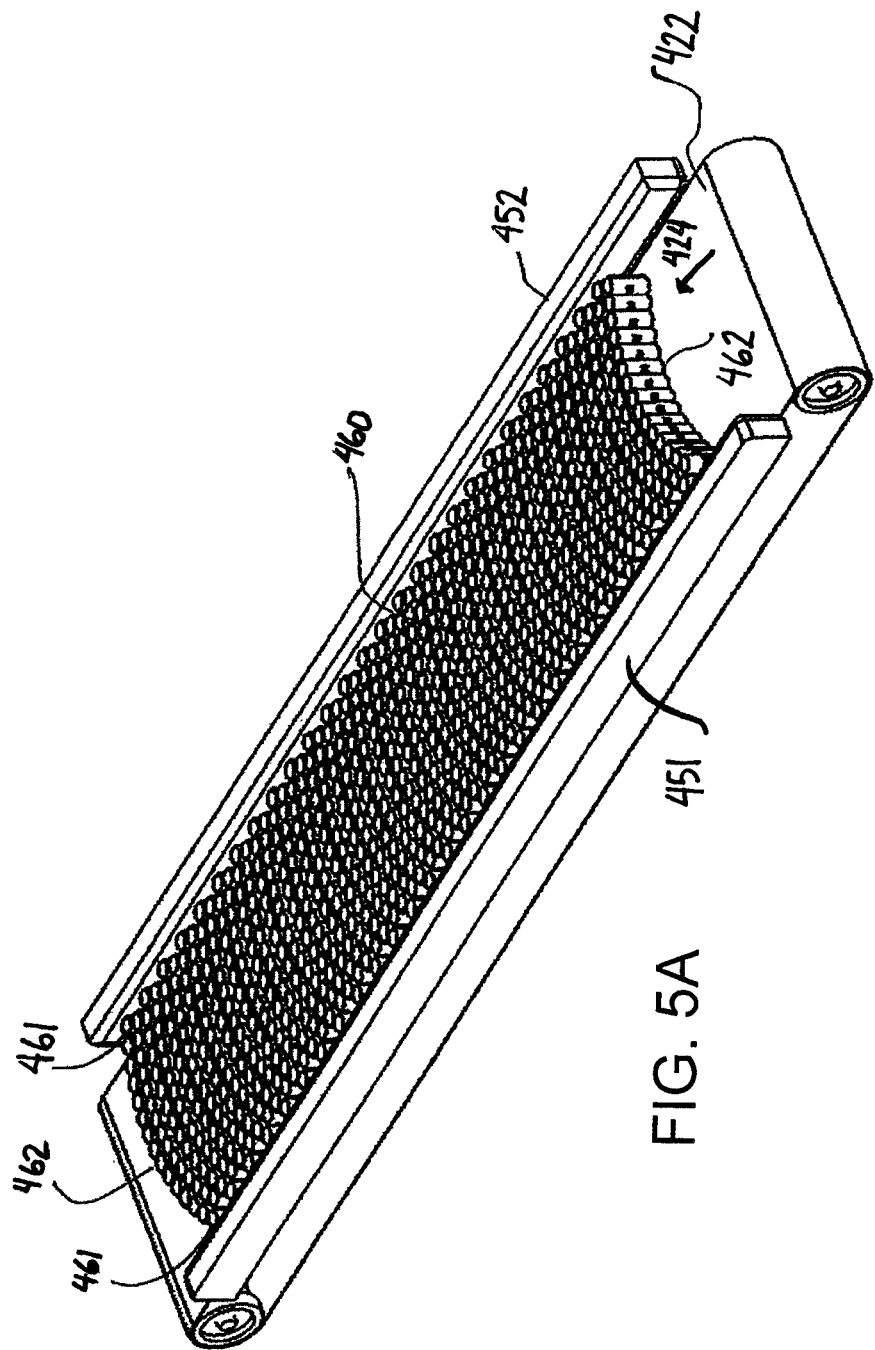
FIG. 5A shows a conveyor having touchless side rails comprising linear induction motors according to another embodiment of the invention.
Figure 5B:
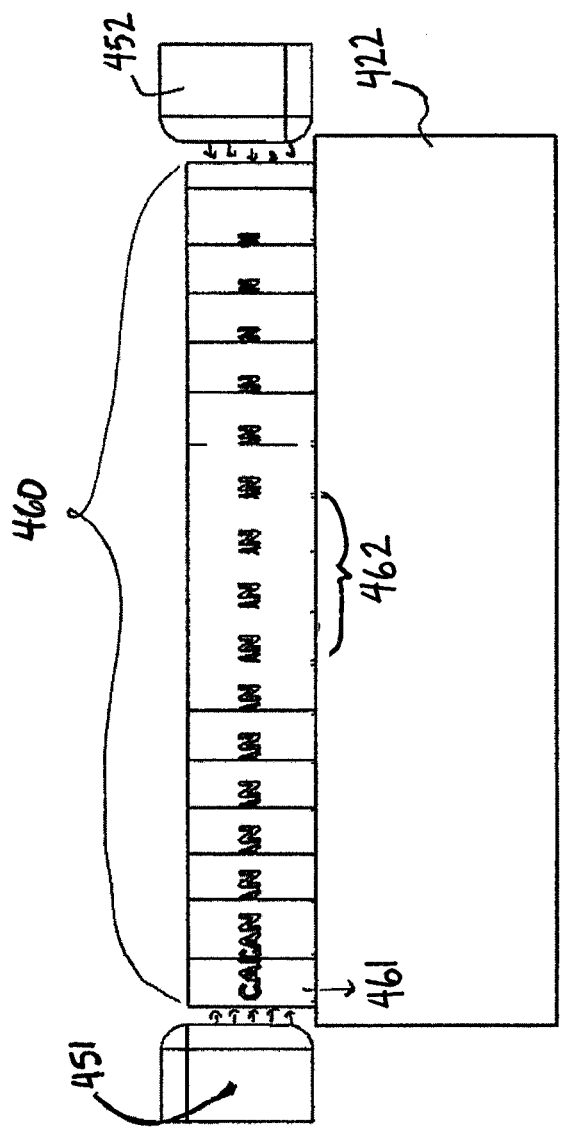
FIG. 5B is a front view of the conveyor of FIG. 5A.

In another embodiment of the invention, a conveyor includes one or more touchless side rails for guiding product along a product path, as shown in FIGS. 4, 5A and 5B. In the embodiment of FIG. 4, a conveyor belt 322 moving in direction 324 includes one or more side rails 341, 342 comprising a permanent magnet array. The side rails 341, 342 are adjacent to the product path. As the conveyor belt 322 moves the product, illustrated as a collection of aluminum cans 360, past the rails 341, 342, the permanent magnet arrays induces an eddy drag on the outer cans 351 in the set of conveyed aluminum cans, allowing the inner cans 352 to flow forward, similar to fluid in a pipe. The eddy drag in the outer cans 351 cushions the cans and protects them from damage while promoting conveyance of the cans along the product path.

As shown in FIGS. 5A and 5B, in another embodiment, a conveyor belt 422 moving in direction 424 includes side rails 451, 452 comprising linear induction motors (LIMs). The LIMs 451, 452 generate a repelling force on outer cans 461 in a set of aluminum cans 460, repelling the outer cans from the side rails 451, 452 to reduce potential damage while causing the inner cans 462 to flow forward.

Figure 6A:
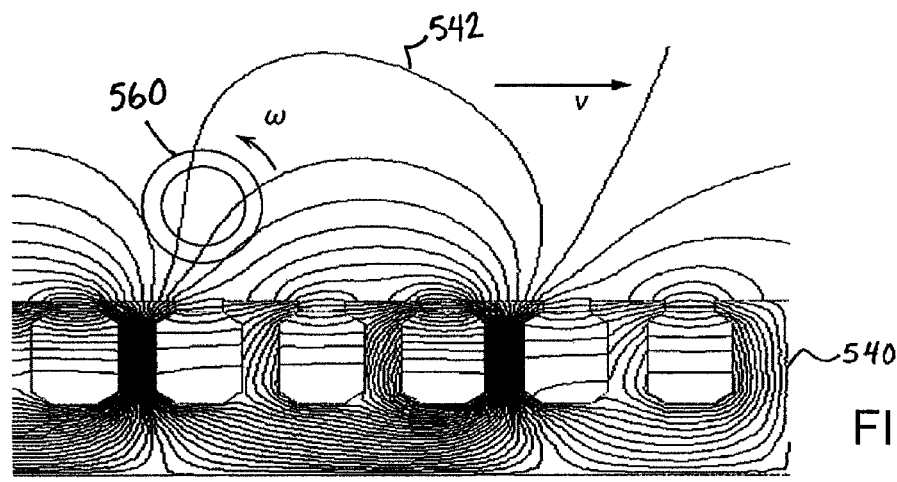
FIGS. 6A-6C are sequential top views of a guide device and aluminum can during propagation of a magnetic field.
Figure 6B:
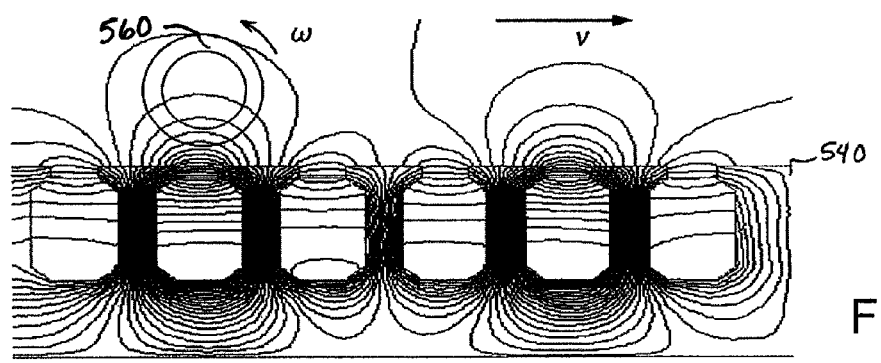
Figure 6C:
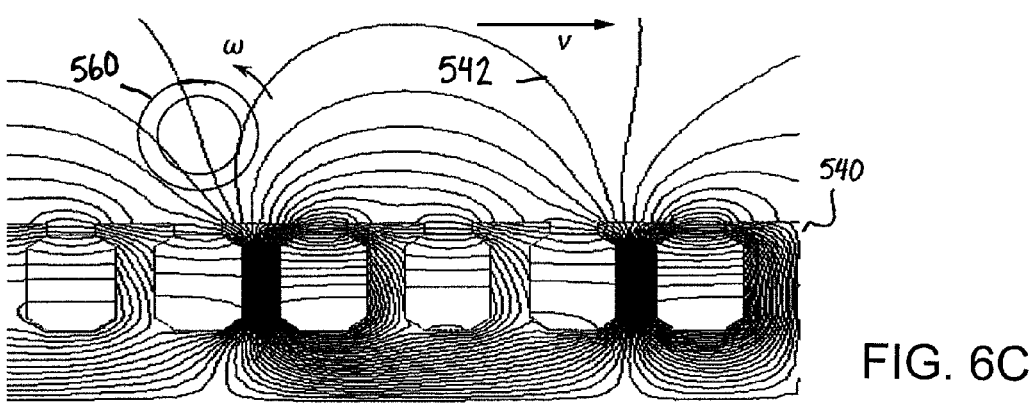
Figure 7:
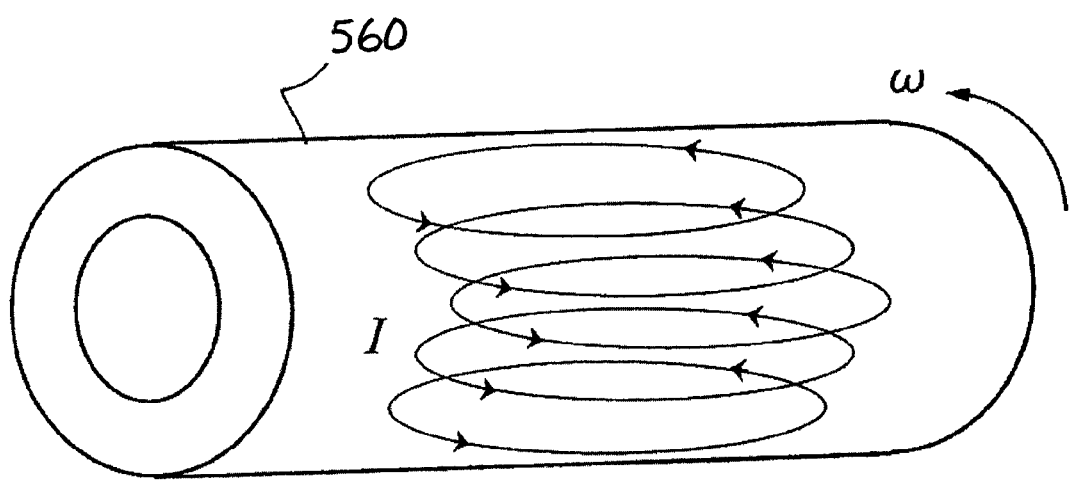
FIG. 7 shows a can having a current induced by a guide device according to one embodiment of the invention.

FIGS. 6A-6C are sequential top views of a guide device 540 and aluminum can 560 during propagation of a magnetic field. The field V propagates from left to right, creating a field shown by the field lines 542, which induce currents in the can 560. FIG. 7 shows a can 560 having currents I induced by the guide device 540 according to one embodiment of the invention. The induced currents in the can generate a field opposing the field generated by the guide device 540, causing the can to be propelled forward and rotated in the direction of ω. Generally, the net force would be at about a 30° angle from the face of the coil 540.

Figure 8A:
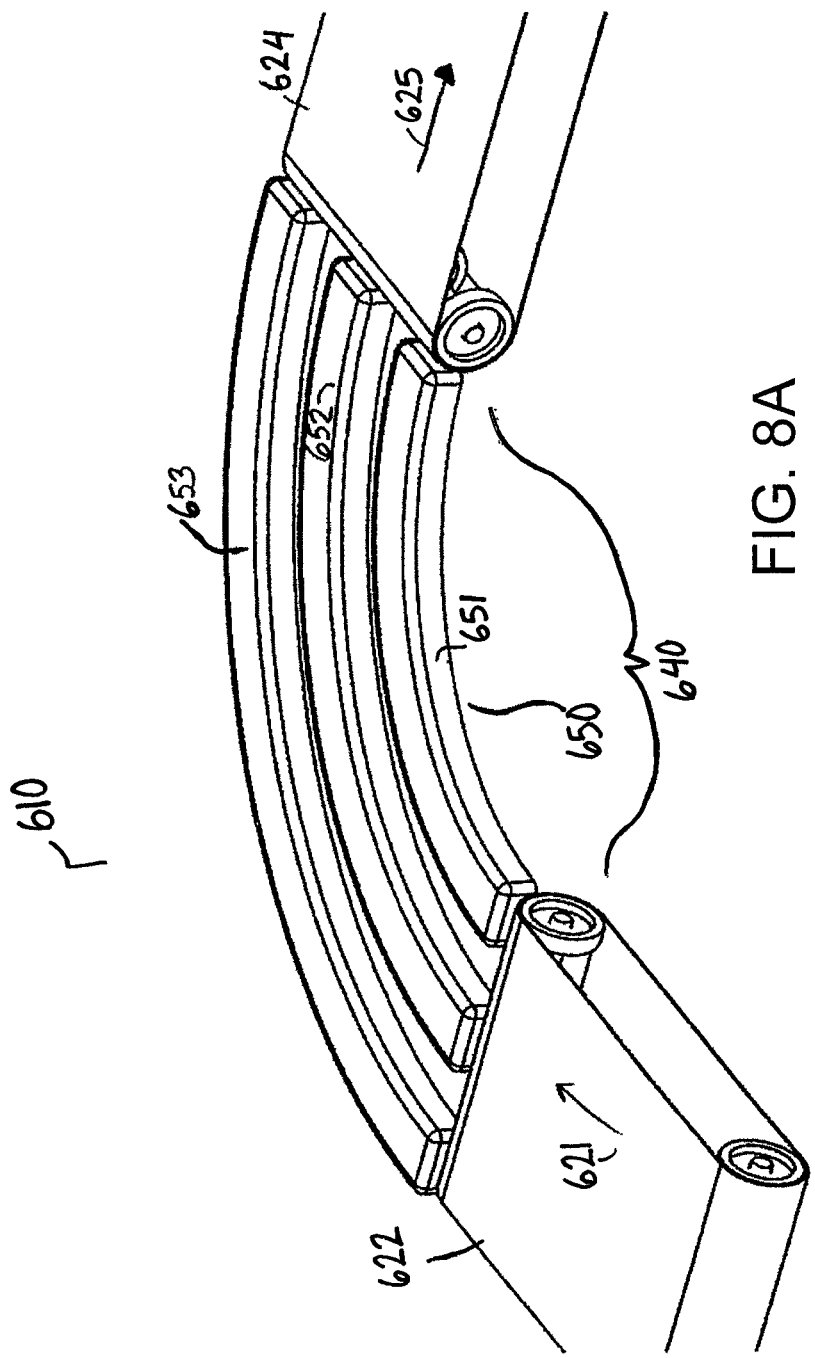
FIG. 8A shows a conveyor junction comprising nested curved rails comprising linear induction motors according to another embodiment of the invention.
Figure 8B:
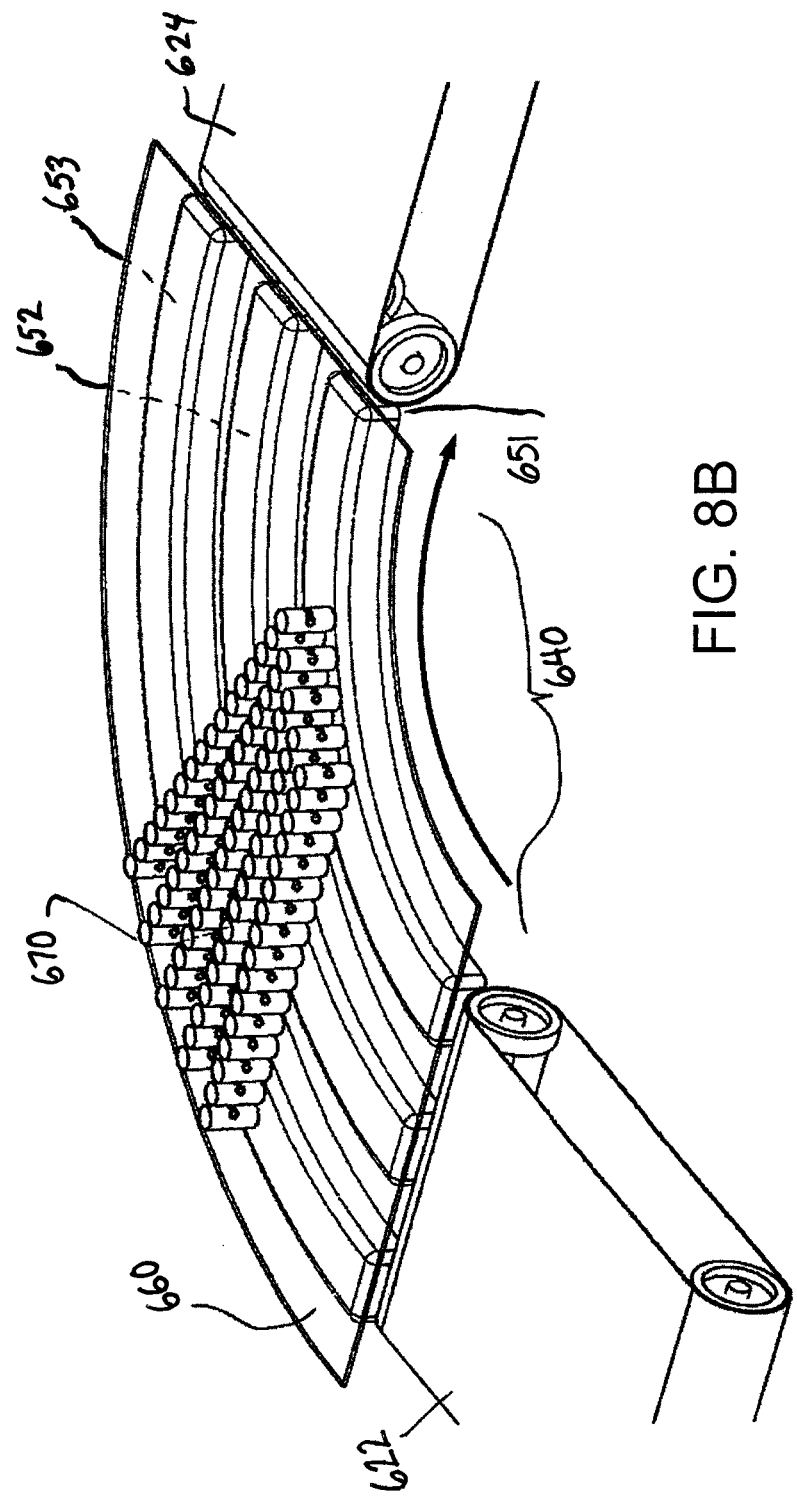
FIG. 8B shows the conveyor junction of FIG. 8A while conveying a set of cans.

FIGS. 8A and 8B show another embodiment of a touchless guide adjacent a product path for guiding product along the product path in a conveyor. In the embodiment of FIGS. 8A and 8B, the touchless guide 650 is disposed below the product path to motivate the cans, or other product, from the bottom direction. The conveyor 610 of FIGS. 8A and 8B comprises a first conveyor belt 622 moving in direction 621, a second conveyor belt 624 moving in direction 625 and a junction zone 640 between the first and second conveyor belt comprising a plurality of curved rails 651, 652, 653 below the product path in the junction zone 640. Each curved rail 651, 652, 653 comprises a linear induction motor (LIM). As shown in FIG. 8B, a low friction surface 660 is disposed directly above the rails 651, 652, 653 to form the product path in the transfer zone 640. The curved LIMs are activated to propel the cans 670 around and through the 90° junction zone 640.

FIG. 9 shows another embodiment of a conveyor 710 employing a touchless guide for guiding product along an adjacent product path. The touchless guide 740 of FIG. 9 comprises an array of linear induction motors (LIMs) 741. A low friction surface 761 directly above the array 740 forms the product path of the conveyor 710 in a transfer zone 760. The LIMS 741 have varying drive angles to drive the cans en masse from the bottom around the 90° transfer zone 760 between a first conveyor belt 722 and a second conveyor belt 724.

The use of a touchless guide, such as a LIM or array of alternating permanent magnets, to generate repelling forces on delicate conveyed products ensures a smooth transfer between belts or smooth conveyance on a single belt. The touchless guide may prevent tipping and minimize damage. With few or no moving parts, the touchless guide is cleanable and requires little to no maintenance.

The invention has been described relative to certain illustrative embodiments, though the invention is not limited to those illustrative embodiments.

What is claimed is:

1. A conveyor, comprising:
   a conveyor belt for conveying articles along a product path; and
   a guide device comprising a linear induction motor positioned relative to the conveyor belt adjacent the product path for generating a repellent force on conveyed articles to direct the conveyed articles along the product path.

2. The conveyor of claim 1, wherein the linear induction motor generates a magnetic field as the repellent force.

3. The conveyor of claim 1, wherein the linear induction motor forms a rail disposed adjacent to the product path.

4. The conveyor of claim 3, wherein the rail is curved.

5. The conveyor of claim 1, wherein the guide device comprises a grid of linear induction motors below the product path.

6. The conveyor of claim 1, further comprising a low friction surface between the product path and the guide device.

7. A conveyor, comprising
   a conveyor belt for conveying articles along a product path; and
   a guide device comprising an array of alternating permanent magnets for touchlessly guiding the articles along the product path without mechanically contacting the articles.

8. The conveyor of claim 7, wherein the array of alternating permanent magnets form a curved rail.

9. The conveyor of claim 7, wherein the guide device is disposed below the product path.

10. The conveyor of claim 7, further comprising a low friction surface between the product path and the guide device.

11. A conveyor, comprising
    a conveyor belt for conveying articles along a product path; and
    a guide device disposed below the product path for touchlessly guiding the articles along the product path without mechanically contacting the articles.

12. The conveyor of claim 11, wherein the guide device comprises a plurality of curved rails below the product path.

13. The conveyor of claim 12, wherein each curved rail comprises a linear induction motor.

14. The conveyor of claim 11, wherein the guide device comprises an array of linear induction motors having varying drive angles.

* * * * *